Sept. 17, 1963
H. O. SELTSAM
3,104,089
SELF-CLOSING LIFT TYPE FAUCET
Filed July 27, 1960
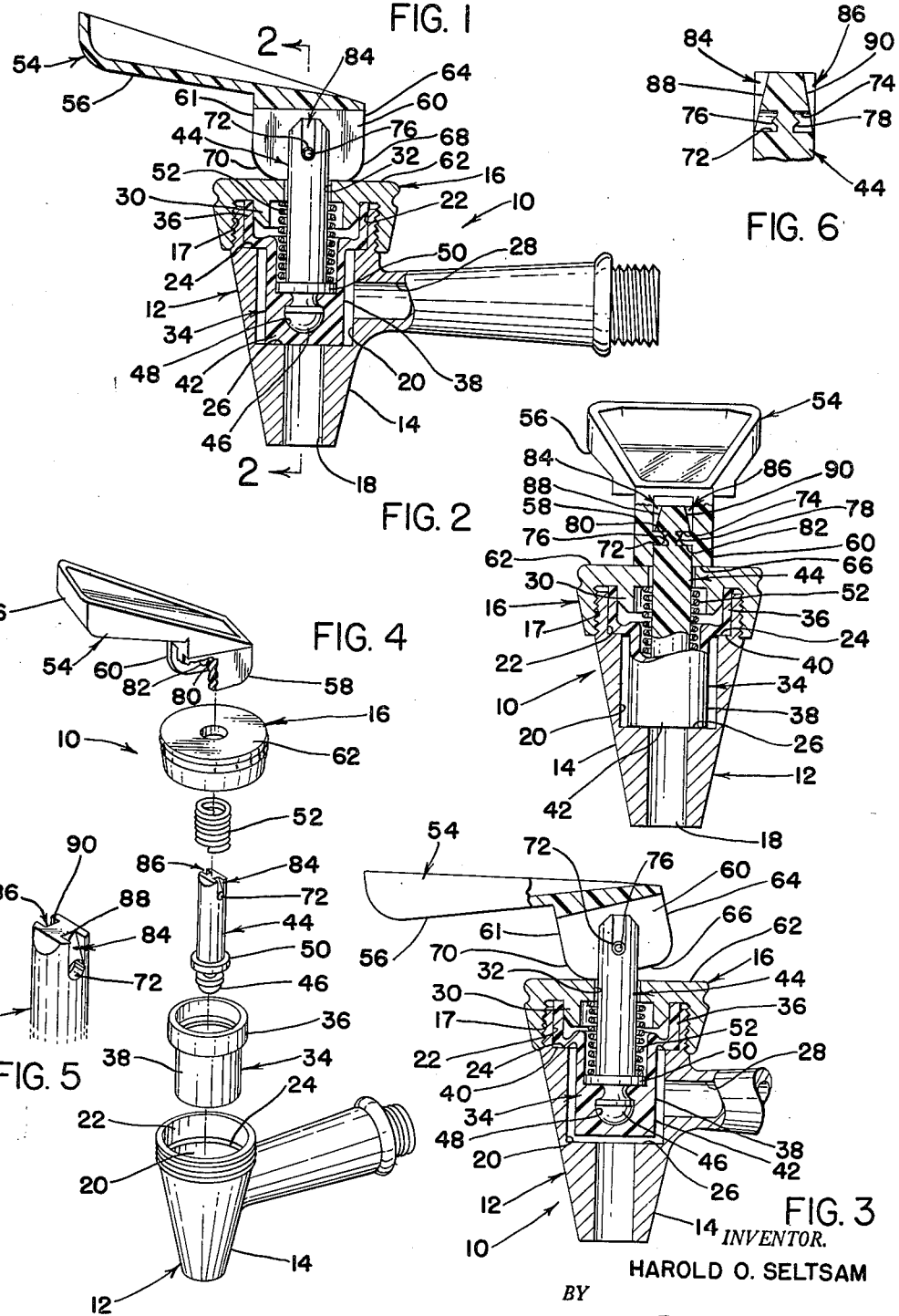
INVENTOR.
HAROLD O. SELTSAM
BY
Fay & Fay
ATTORNEYS United States Patent Office 3,104,089
Patented Sept. 17, 1963

3,104,089
SELF-CLOSING LIFT TYPE FAUCET
Harold O. Seltsam, Rocky River, Ohio, assignor to Tomlinson Industries, Inc., Cleveland, Ohio, a corporation of Ohio
Filed July 27, 1960, Ser. No. 45,695
6 Claims. (Cl. 251—263)

This invention is concerned with valves of the so-called self closing lift type, wherein a generally cup-shaped sealing member is provided with portions mounted on the end of a spring biased reciprocal stem or plunger member urged by a camming handle.

Valves of this general type, lacking complexity and defining extremely satisfactory characteristics in positiveness of action and ease of operation, have received wide acceptance in the industry, particularly that area thereof relating to liquid food or beverage dispensing. While for the most part, self-closing lift type valves have been quite satisfactory, there have been certain aspects of these valves which require definite improvement.

One of these more unfavorable aspects is that the useful life of the sealing member has not been as long as is desirable. Great progress in the correction of this undesirability is represented by the invention disclosed in my copending United States application, Serial No. 820,504, filed June 15, 1959 for "Seat Cup." Certain of the inventive concepts herein disclosed represent even more progress in the direction of optimizing the useful life of sealing members of the type employed in self-closing lift type valves.

A further disadvantage of certain self-closing lift type valves has centered around the fact that the sealing characteristics of such valves are not always completely satisfactory. This invention represents a considerable improvement over a large number of prior art valves in this regard.

Still another important consideration in the development of the instant invention relates to the provision of means for attaching the valve handle to the valve stem in a more efficient manner from the standpoint of assembly and production costs. Heretofore a transverse pivot pin has been widely used for this purpose. This arrangement, however, renders assembly difficult, and in use the pin often becomes inadvertently displaced and/or lost.

The valve of the instant invention has been designed with these considerations in mind in order that a workable solution to many of these problems might be proposed. A valve embodying the inventive principles herein disclosed utilizes a sealing member which may be operated with a minimum of interference with the remaining components of the valve in order to reduce wear on the member and thereby increase its useful life. Such a valve also includes components so interrelated as to produce a slight degree of compression upon a portion of the sealing member to prevent leakage around the valve bonnet of fluids transmitted through the valve. A valve designed in accordance with the teachings of the invention also includes novel structure for snap-fitting the handle to the stem in pivotal association therewith.

A general object of the invention is to provide a valve of the self-closing lift type which defines superior characteristics over hitherto known valves in the areas of wear optimization, positive action, assembly efficiency and production economy.

A more specific object of the invention is to provide a valve of the type described in which the operation of the sealing member is met with a minimum of interference from the surrounding components so as to reduce wear on the sealing member.

A further object of the invention is to provide novel structure for attaching the handle to the valve stem in order that these components may be assembled with a maximum of ease.

Still another object of the invention is to provide a structure for attaching the valve handle and stem in substantially maintenance-free pivotal relationship.

A still further object of the invention is to provide attaching structure for a pivotal valve handle stem combination which reduces the effective area of bearing surface between the handle and stem to a minimum, thereby to decrease wear between the components of this combination.

A further object of the invention is to provide a valve of the type described wherein the components are so proportioned and arranged as to provide an initial compression in portions of the sealing member thereby to increase the sealing action of that member.

Other and further objects of the invention will be apparent from the detailed description to follow.

In the drawings:

FIG. 1 is a side elevation, partly in section, of a valve embodying the concepts of the invention;

FIG. 2 is a front elevation of the valve, partly in section, and taken along line 2—2 of FIG. 1;

FIG. 3 is a fragmentary view, partly in section, of the valve shown in FIG. 1, and illustrating the relative position of the various components when the valve is open;

FIG. 4 is an exploded perspective view in reduced scale of the valve;

FIG. 5 is a fragmentary perspective view in enlarged scale of the outer end of the valve stem, and FIG. 6 is a fragmentary sectional view illustrating the stem means and the relative positions and shapes of the grooves and apertures.

Referring now more particularly to the drawings, I have illustrated in FIG. 1 a self-closing lift type valve indicated generally at 10 comprising a housing 12 made up of a body 14 having a bonnet 16 removably mounted thereon as by means of screw threads 18. Formed along the axis of the vertical portion of the body 14, as seen in FIG. 1, is an outlet passageway 18. A pair of counterbores 20 and 22 are provided in the body 14 in coaxial alignment with the outlet passageway 18. The counterbore 22 enters the body 14 from the upper end thereof, is of somewhat larger diameter than the counterbore 20 and is joined thereto by means of a radial shoulder 24 which lies in a plane generally perpendicular to the axis of the counterbores and outlet passageway.

The counterbore 20 is disposed intermediate the counterbore 22 and the outlet passageway 18, is of larger diameter than the outlet passageway 18 and is joined to the outlet passageway by means of a radially extending shoulder 26 which also lies in a plane generally perpendicular to the axis of the counterbores and the outlet passageway. The shoulder 26 functions as a sealing seat for the sealing member to be described hereinafter. Inlet passageway 28 enters the counterbore 20 at substantially right angles thereto, and when the valve is open acts in conjunction with the counterbore 20 and the outlet passageway 18 to define the flow path through the valve.

The bonnet 16 is provided with an inwardly projecting annular rib 30 spaced radially both from the central axis of the bonnet and from the threaded portion thereof. An aperture 32 is provided in the bonnet and both this aperture and the annular rib 30 are coaxial with the counterbores 20 and 22 and with the outlet passageway 18 when the bonnet is threadedly received upon the body 14.

An elastomeric cup-like sealing member 34 is received within the counterbores 20 and 22 of the housing. The sealing member 34 includes a cylindrical tubular body portion 36 which fits snugly within the counterbore 22, and a tubular cylindrical nipple portion 38 coaxial with the body portion 36 and projecting therefrom toward the radial seat 26. The body portion 36 and the nipple portion 38 are interconnected by means of a radially extending shoulder wall 40 which lies in a plane substantially perpendicular to the axis of the sealing member. The nipple portion 38 is closed at its free end by means of a relatively heavy transverse end wall 42. The length of the nipple portion 38 is approximately twice that of the body portion 36 for reasons to be discussed later. The sealing member 34 when received within the housing of the valve is arranged substantially coaxial with the axis of the counterbores 20 and 22 and the outlet passageway 18.

As will be observed, the upper or outer annular margins both of the body 14 of the housing and of the body portion 36 of the sealing member are received within the space defined between the threaded portion of the bonnet 16 and the annular rib 30 thereof. In order to provide improved sealing between the housing and the body portion 36 of the sealing member 34, the radial thickness of the body portion 36 is so proportioned relative to the space defined between the annular rib 30 and the counterbore 22, as to set up a compression in the body portion 36. In actual practice an effective magnitude of compression has been found to be about 0.010 inch on a side or 0.020 inch total.

An elongated valve stem 44 is coaxially aligned with the axis of the counterbores 20 and 22 and the outlet passageway 18, with its inner end portion being opposed to the sealing seat 26, and its outer end portion extending through the aperture 32 in the bonnet 16. The inner end of the stem 44 is provided with a button 46 which is removably snap-fitted into a recess 48 of coresponding configuration formed in the end wall 42 of the sealing member 34. A radial flange 50 extends circumferentially about the stem 44 near the button 46 and is adapted to seat against the inner side of the end wall 42. A suitable compression spring 52 is received around the stem 44 and seats at the inner end against the radial flange 50 and at the outer end against the bonnet 16.

An operating handle indicated generally at 54 includes a lever portion 56 extending generally perpendicular to the axis of the stem 44. The end of the lever portion 56 most closely adjacent the stem 44 is provided with a pair of parallel runners 58 and 60, spaced apart a distance sufficient to allow reception therebetween of the the outer end portion of the stem 44. Each of these runners extends substantially perpendicular to the outer flat face 62 of the bonnet 16. The face 62 lies in a plane generally perpendicular to the axis of the stem 44 and serves as a bearing surface for the runners 58 and 60.

Since the runners 58 and 60 are substantially identical, only the runner 60 will be described with particularity. As will be observed in FIGS. 1 and 3, this runner is more or less rectangular in form, having a pair of spaced substantially parallel side edges 61 and 64. A generally flat bottom edge 66 is adapted to lie flush against the outer surface 62 of the bonnet 16 when the valve is closed as best seen, for example, in FIGS. 1 and 2. The bottom edge 66 is joined with the edge 64 by means of a curved cam surface 68 and with the edge 61 by another curved cam surface 70 consideraly more gradual than the surface 68.

In order to provide for attachment of the handle to the stem 44, the outer end portion of the stem is provided with a pair of diametrically opposed, radially extending apertures 72 and 74. The bottom wall of each aperture is provided with a generally conical protuberance generally coaxial with the axis of the aperture in which it is formed, and diverging toward the mouth of that aperture. These protuberances are identified in FIG. 2 as numbers 76 and 78. The runners 58 and 60 are provided with opposed lugs 80 and 82 which project toward the stem 44 and which are of a size to be snugly but pivotally received within the apertures 72 and 74.

To facilitate entry of the lugs into the aperture, a pair of grooves or guide surfaces 84 and 86 are provided which extend from the upper end of the stem 44 to the apertures 72 and 74. These grooves are formed with sloping bottom walls or ramps 88 and 90, respectively, which converge towards each other in a direction away from the apertures 72 and 74. At the junctures of the bottom walls or ramps 88 and 90 with the outer end of the stem 44 the bottom walls or ramps 88 and 90 are spaced apart a distance about equal to the distance defined between the opposed free ends of the lugs 80 and 82. At the junctures of these walls with the apertures 72 and 74, the distance between the walls is about equal to the stem diameter.

When the handle 54 is to be mounted upon the stem 44, the lugs 80 and 82 are positioned in the portions of the grooves 84 and 86 adjacent the outer end of the stem. The runners 58 and 60 are capable of limited flexure, and when a force is applied along the axis of the stem, the lugs 80 and 82 ride along the sloped bottom walls or ramps 88 and 90 of the grooves 84 and 86. The riding of these lugs along the bottom walls generates a camming action which causes the runners 58 and 60 to spread apart a distance sufficient to allow the lugs 80 and 82 to pass or snap into the apertures 72 and 74.

Obviously, after the lugs have been snapped into the apertures, the handle is locked to the stem 44 in a semi-permanent fashion and under normal circumstances cannot be removed therefrom in the field. Pivotal action of the handle 54 with regard to the stem is permitted, however, and the ease of such action is implemented by means of the conical protuberances 76 and 78 which reduce the bearing surface area between the lugs and the apertures. These conical protuberances also serve to keep the runners spread apart and thereby prevent them from collapsing toward each other. It will be realized that the protuberances 76 and 78 may, if desired, be provided on the free ends of the lugs 80 and 82 rather than on the bottom walls of the apertures 72 and 74.

Forces exerted against the lever portion 56 of the handle 54 will, quite obviously, cause movements of the runners 58 and 60 about the lugs 80 and 82 as an axis of rotation. Assuming that the handle 54 is pivoted in a counterclockwise direction, the curved cam surface 70 will move relative to the outer surface 62 of the bonnet 16, thereby imparting a reciprocal motion of the stem 44 in a direction away from the seat 26. Inasmuch as the inner end of the stem 44 is attached to the transverse end wall 42 of the nipple portion 38 of the sealing member 34, and inasmuch as the body portion 36 of the sealing member 34 is held against appreciable axial displacement, the reciprocal motion of the stem 44 will cause the nipple portion of the seal to be telescoped within the body portion thereby breaking sealing contact between the end wall 42 and the sealing seat 26 to allow flow through the valve. It will be noted in this regard that the outside diameter of the nipple portion is considerably smaller than the diameter of the counterbore 20, so that sufficient clearance is provided to allow fluid to pass from the inlet passageway 28 through the counterbore 20 and into the outlet passageway 18.

Because of the relatively gradual curve upon which the cam surface 70 is formed, and because abutment between the lever portion of the handle and the bonnet prevents rotation of the runners to a position at which the flat edge 61 would engage surface 62 of the bonnet, the handle 54 will be automatically returned to the position seen in FIG. 1 once the force applied thereto is released.

If, by initial pressure, the handle is moved in the clockwise direction, the relatively abrupt cam surface 68, as it moves relative to the outer surface 62 of the bonnet 16, will also cause a reciprocal motion to be imparted to the stem 44. However, the abruptness of the cam surface 68 together with the lack of interference between the lever portion 56 of the handle and the bonnet 16, allow the handle 54 to be pivoted to the position where the flat edge 64 of the runner 60 and the equivalent edge of the runner 58 contact the surface 62 of the bonnet 16. In this position the handle is locked in place and the biasing force alone of the spring 52 cannot impart counter-rotation to the lever 54. In this way, the valve may be held in open position indefinitely without the application of additional manual pressure on the handle.

Another important aspect of the invention is that the difference in the distance defined between the pivotal axis of the handle and the edge 66 and that defined between the pivotal axis and any point on the cam surface 70 or on the cam surface 68 is smaller in magnitude than the distance between the opposed surfaces of the radial shoulder 40 of the sealing member 34 and the inner end of the annular rib 30. In this way, the maximum travel of the stem 44 will not be sufficiently great to cause abutment or interference between the radial shoulder and the annular rib. It will be apparent that the continual striking of the radial shoulder and the annular rib throughout several hundred cycles of valve operation would result in accelerated wear on the sealing member 34, which is, of course, highly undesirable. Experience has shown that by constructing the nipple portion of the sealing member with a length about twice that of the body portion thereof, rather remarkable increase is achieved in the life of the sealing member. This construction reduces the amount of travel of the nipple portion within the body portion to increase the flex life.

While, for purposes of simplicity, the invention has been described as being embodied in but a single form, those skilled in the art will immediately recognize the fact that a number of modifications could be made to the illustrated form without departing from the true spirit of the invention. It is, therefore, my desire to be limited only by the scope of the appended claims.

I claim:

1. In a valve of the type including a housing, a reciprocal stem in the housing carrying a seal on its inner end for movement into and out of engagement with a sealing seat, resilient means normally urging said seal into engagement with said seat, the housing including a bearing portion disposed transverse the axis of the stem and through which the outer end of the stem projects, a handle having a pair of spaced generally parallel semi-flexible runners substantially perpendicular to the bearing surface, each of said runners having cam surfaces at opposite ends for varying the compression on said seal when said handle is moved, said cam surfaces merging smoothly with side edges on each of said runners, the outer end of said stem being disposed between said runners and pivotally attached thereto by a pair of lugs carried by said runners, said pair of lugs being snap fitted into a pair of co-operating bores in said stem, each of said co-operating bores having an inclined guide surface leading thereinto to facilitate snap fitting of said lugs therein, said handle having a lever portion extending from adjacent said side edges of said runners outwardly of said housing, so that depression of said lever portion will move said cam surface relative to said bearing surface thereby reciprocating said stem, said lever being so oriented relative to the housing that on full depression said lever engages said housing before the side edges of said runners engage said bearing surface whereby on release of said handle said resilient means returns said seal into engagement with said sealing seat.

2. The valve of claim 1 wherein the side edge portions of each of said runners on the side opposite the lever portion of said handle merge with said lever portion to form an uninterrupted terminal portion of said lever.

3. Structure as defined in claim 1 in which each of said bores extends partially through the stem and terminates in a bottom wall, the bottom wall of each bore being provided with a protuberance to reduce the bearing area between the lugs and the bores.

4. Structure as defined in claim 3 in which each protuberance is generally conical in form.

5. Structure as defined in claim 1 in which the seal is elastomeric in nature and includes a cylindrical tubular nipple portion closed at one end by means of a transverse end wall and joined by a radial shoulder at the other end to a coaxial enlarged diameter tubular body portion, both the nipple portion and the body portion opening in the direction of the outer end of the stem, with the nipple portion being mounted upon the inner end of the stem, the outer marginal edge of the body portion of the seal being compressed between radially spaced, opposed, annular walls of the housing, to establish thereby a fluid sealing relationship between the housing and the body portion of the seal.

6. Structure as defined in claim 5 in which the spacing between the lugs of the handle and the cam surfaces thereof is sufficient to prevent the radial shoulder interconnecting the body and nipple portion of the seal from abutting the portion of the housing defining the radially inner end of the spaced, opposed, annular walls.

References Cited in the file of this patent

UNITED STATES PATENTS

| | | |
|---|---|---|
| 28,699 | Tate | June 12, 1860 |
| 49,527 | Jenkins | Aug. 22, 1865 |
| 265,530 | Merriman | Oct. 3, 1882 |
| 1,550,845 | Rickards | Aug. 25, 1925 |
| 1,990,635 | Buttner | Feb. 12, 1935 |
| 2,360,603 | Ward | Oct. 17, 1944 |
| 2,405,148 | Keahey | Aug. 6, 1946 |
| 2,521,172 | Kollmann | Sept. 5, 1950 |
| 2,603,445 | Marchant | July 15, 1952 |